United States Patent [19]
Grüdelbach

[11] 4,099,099
[45] Jul. 4, 1978

[54] METHOD OF AND SWITCHING DEVICE FOR REDUCING FEEDBACK FROM A CONSUMER PERIODICALLY CONNECTED TO AN A.C. LINE

[75] Inventor: Hans-Dieter Grüdelbach, Plön, Germany

[73] Assignee: Poul Hahn Evers, Pura, Switzerland

[21] Appl. No.: 773,280

[22] Filed: Mar. 1, 1977

[30] Foreign Application Priority Data

Oct. 19, 1976 [CH] Switzerland .................. 13236/76

[51] Int. Cl.$^2$ .................. G05F 1/00; H05B 37/02; H05B 39/04; H05B 41/36
[52] U.S. Cl. .................. 315/194; 315/46; 315/72; 315/224; 315/291; 315/DIG. 7
[58] Field of Search .................. 307/98, 112, 125; 315/46, 47, 72, 74, 119, 125, 194, 199, 200 R, 207, 208, 224, 225, 226, 287, 291, DIG. 7

[56] References Cited

U.S. PATENT DOCUMENTS 3,265,930 8/1966 Powell .................. 315/207

Primary Examiner—Alfred E. Smith
Assistant Examiner—Robert E. Wise
Attorney, Agent, or Firm—Browdy and Neimark

[57] ABSTRACT

A method of polarity-independent reduction of feedback from a complex consumer or consumers periodically connected to an A.C. line is of the type involving disconnection of the consumer or consumers from the line during each half wave of the A.C. line voltage. The consumer or consumers are damped and discharged during each half wave of the A.C. line voltage by a power switching device, the power switching device being rendered operative whenever the connection between the consumer or consumers and the line is interrupted. A power switching device includes the collector-emitter leads of a pair of transistors and a set of rectifiers, preferably in the form of a bridge circuit, supplies voltage at the proper polarity for the consumer or consumers to the transistors. The secondary windings of respective transformers are connected to the base-emitter circuit of the respective transistors. The primary windings of the respective transformers are connected to distinct outputs from a source to supply driving voltage to the transistors. A Darlington transistor is coupled across the consumer or consumers via a further rectifier bridge and a winding of a choke, its input being connected to the secondary winding of a third transformer. The primary winding of the third transformer is connected to a third output from the source.

11 Claims, 5 Drawing Figures

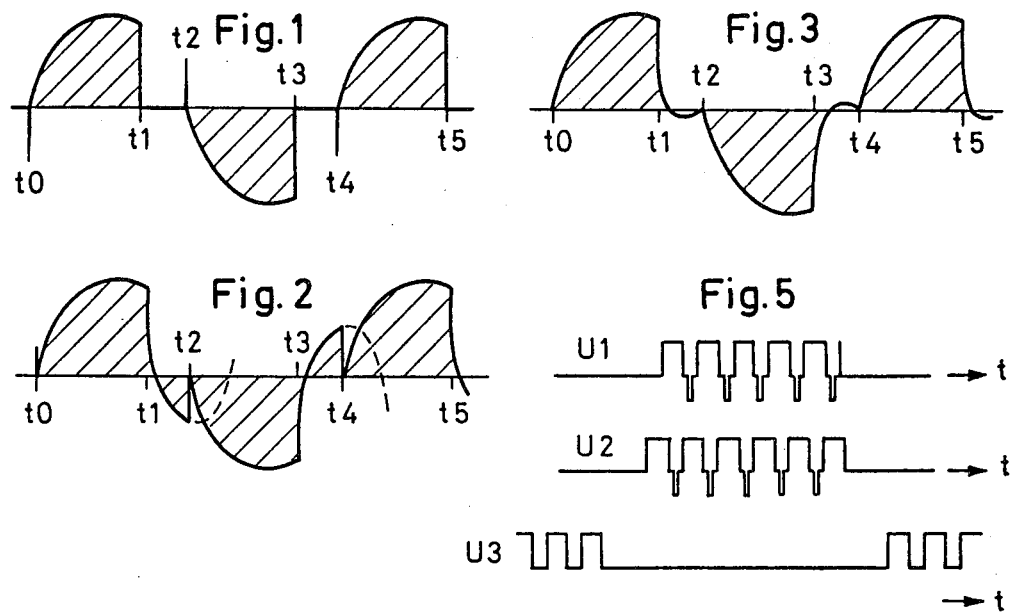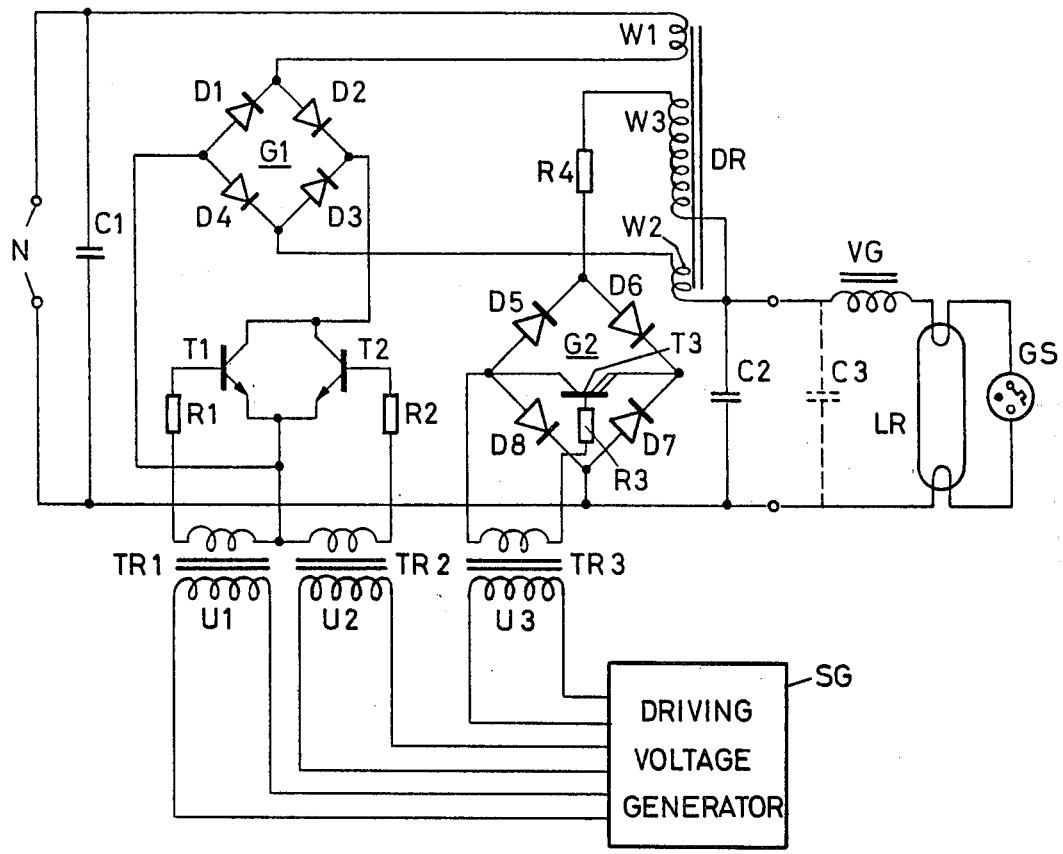

METHOD OF AND SWITCHING DEVICE FOR REDUCING FEEDBACK FROM A CONSUMER PERIODICALLY CONNECTED TO AN A.C. LINE

BACKGROUND OF THE INVENTION

This invention relates to a method of a power switching device for polarity-independent reduction of feedback from a complex consumer or consumers periodically connected with an A.C. line. The invention relates, more particularly, to such a method and device provided with interruption of the connection of the consumer or consumers to the line occurring in each half wave of the A.C. line voltage.

It has been proposed, as disclosed in a patent application of Hans-Dieter Grudelbach, Ser. No. 773,279 filed on even date and based on Swiss Patent Application No. 11447/76 filed Sept. 9, 1976, to regulate the electrical power supplied to a consumer (utilization device) in an A.C. network by setting the corresponding current flow angle in such manner that the consumer is disconnected from the A.C. line during each half wave at a phase angle of the A.C. line voltage which corresponds to the desired current flow angle. The consumer consequently is connected to the line at least, approximately, at the zero cross-over point of the A.C. line voltage. In this arrangement, it is the energy stored up electrically or magnetically at the moment of disconnection that dies out and dissipated in the consumer. It is assumed in this connection that a voltage surge can occur. Since the consumer also usually includes inductive and capacitive components, temporary changes in the direction of flow of the current are unavoidable in the consumer. Moreover, it is necessary to maintain similarity between the electrical state in the consumer and in the line, if the consumer is to receive additional current, or allowance must be made for the fact that additional peak loads will be produced.

SUMMARY OF THE INVENTION

It is the principal object of the present invention to provide a method and power switching device which provides a consumer (utilization device) discharge which will be at least approximately complete in the consumer when it is periodically connected to the A.C. line at the zero cross-over points in the A.C. line voltage. In this manner, the danger of the development of peak loads at the moment of connection can be avoided, whereby high-frequency interference phenomena on the one hand and overloading of the line switching device which connects the consumer to the line on the other can be avoided.

The foregoing object, as well as others which are to become clear from the text below, is achieved in the method of the type described hereinabove according to the invention by providing that the consumer is damped and discharged during each half wave of the A.C. line voltage by a power switching device. The power switching device is rendered operative each time the connection between the consumer and the line is broken and is rendered inoperative before the consumer is reconnected to the line.

In the method according to the invention, the power-switching device which damps and discharges the consumer is always operative when the line switching device which connects the consumer with the A.C. line is operative. In this manner, the energy stored in the consumer during the time interval before the next reconnection of the line switching device at the next zero cross-over point in the A.C. line voltage can be discharged through the consumer and the power switching device which is rendered operative, so that not only is there no voltage at the terminals of the consumer when the aforesaid reconnection takes place, but the consumer also has no further electrical or magnetic energy stored up. Therefore, no peak loads can appear when the consumer is reconnected to the A.C. line.

Thyristors or similar switching devices can be used as power switching devices for the method according to the invention. The use of thyristors which can be blocked as power switching devices, however, currently requires the use of series-connected rectifiers, since these thyristors do not exhibit sufficient blocking capacity with reversed polarity.

An advantageous embodiment of the method according to the invention provides for the use of at least one transistor in the power switching device, the collector-emitter leads of the transistor being connected in a current path parallel to the consumer. The transistor is switched in and out during the time intervals between the breaking of the connection and restoration of the connection of the consumer to the line at a switching frequency higher than the line frequency; thus, disconnection always takes place during a period of time which is shorter than the storage time of the transistor. With regard to the charging time, it is advantageous to use a Darlington transistor as the transistor, the cost of which is only slightly higher, if at all, than that of a conventional transistor. Such Darlington transistors currently have charging times of approximately 15–20 microseconds, so that the storage effect of the Darlington transistor can be utilized to bridge the gating OFF pulses.

In order to keep the power required to drive the transistor at a low level, it is advantageous to use a driving voltage which is at least approximately a square-wave voltage to drive the transistor and to supply this driving voltage to the transistor through a transformer.

The invention also relates to a power switching device for carrying out the method described above, wherein at least one transistor is used in the power switching device. According to the invention, the power switching device is characterized by the fact that the collector-emitter leads of the transistor, and a set of rectifiers to ensure that the voltage supplied to the consumer is fed to the transistor at correct polarity and a load connected parallel to the consumer are connected in series. The secondary winding of a transformer is connected in the base-emitter circuit of the transistor, the primary winding of said transformer being connected to a switching device for producing the driving voltage for the transistor.

In an advantageous embodiment of the power switching device according to the invention, the set of rectifiers are arranged as a bridge rectifier, one of whose diagonals is connected parallel to the consumer and with the collector-emitter leads of the transistor connected to the other diagonal.

To absorb the energy stored in the consumer when the latter is discharged, the load connected parallel to the consumer can include an ohmic resistor and a choke.

An important application of the power switching device according to the invention involves regulating the brightness of an illuminating fixture by means of a line switching device of the invention whose variable current flow angle begins in each half wave of the A.C. line voltage at least approximately at a phase angle of zero degrees of the A.C. line voltage. The defined discharge of the entire consumer line creates stable conditions at the beginning of each half wave and reduces the danger of extinguishing the light by suppressing unintentional glow discharges across starters which may be involved in the extinguishing process, as would occur without this discharge and damping circuit.

Further applications of the power switching device are advantageous; however, for example their use in controlling the power requirements of electric motors. In this area, the present power switching device provides optimal integration of the current fed to the motor and therefore allows additional improvement in the quiet operation of the motor by eliminating a change in the direction of the current which would otherwise occur as a result of extinction following switching-off of the power switching device which supplies the current.

BRIEF DESCRIPTION OF THE DRAWINGS

FIG. 1 is a graphical representation showing the current as a function of time for a consumer without use of the method according to the invention, with periodic disconnection of the consumer from the A.C. line and with reconnection of the consumer to the line.

FIG. 2 is a graphical representation showing the voltage as a function of time as it appears at the consumer without using the method according to the invention.

FIG. 3 is a graphical representation showing the voltage as a function of time as it appears in a consumer when the method according to the invention is used.

FIG. 4 is a schematic circuit diagram of a device for controlling the brightness of an illuminating fixture using an exemplary embodiment of a power switching device according to the present invention and for carrying out the method of the present invention.

FIG. 5 is a diagram of the control pulses as a function of time which are used in the device shown in FIG. 4.

DETAILED DESCRIPTION OF THE PREFERRED EMBODIMENT

FIG. 1 shows the current, as a function of time, drawn by a consumer from an A.C. power line. The consumer is connected with the A.C. line in each half wave when the line voltage passes through zero cross-over points, i.e., at points $t0$, $t2$, $t4$, etc., and the consumer is disconnected from the A.C. line at respectively later points in time $t1$, $t3$, $t5$, etc., which corresponds to the desired current flow angle. It is evident that each time the consumer is reconnected to the line at points $t0$, $t2$, $t4$, etc., pronounced peak loads develop, indicated in FIG. 1. Such peak loads cause considerable high-frequency interference voltages and also impose a load on the switching device which effects the disconnection of the consumer from the line and reconnects it to the line, the switching element of the device usually being a semiconductor circuit which is sensitive to current and voltage peaks.

The cause of the peak loads in FIG. 1 is shown in FIG. 2, which shows the corresponding curve of the voltage in the consumer as a function of time. At time $t1$ the consumer is disconnected from the line. The voltage in the consumer then decreases, for example as shown by the solid curve, and attempts to continue along the dashed line. However, since the consumer is reconnected to the line at point $t2$ when the A.C. line voltage passes through a zero cross-over point, the decay process must be interrupted and the voltage in the consumer must necessarily correspond to the line voltage. The jump in the consumer voltage indicated in FIG. 2 at point $t2$ from a negative value to a value which is practically zero when the A.C. line voltage passes through the zero cross-over point produces the peak load shown in FIG. 1 at point $t2$ as well as at corresponding points $t4$, etc., each time a new switching phase begins.

According to the method of the present invention, the consumer is damped and its energy content essentially short-circuited at all of points $t1$, $t3$, $t5$, etc., or shortly thereafter, i.e., after the consumer is disconnected from the A.C. line. The effect of this novel method is shown in FIG. 3. It is evident from FIG. 3 that as a result of the external damping and discharge beginning at points $t1$, $t3$, $t5$, etc., the voltage assumes a forced, steeply declining curve, so that it is practically zero at point $t2$, $t4$, etc., at which the consumer is reconnected to the line. Consequently, the current drawn by the consumer from the line no longer exhibits the peak loads shown in FIG. 1 at points $t2$, $t4$, etc., and has the characteristic of the curve of FIG. 3 instead.

FIG. 4 is a schematic diagram of a device for controlling the brightness of an illuminating fixture. In this device, a plurality of ballasts VG and a plurality of fluorescent tubes LR are connected as consumers, of which only one each is shown for the sake of clarity, as well as appropriate glow starter GS, connected via a line switching device to terminals N of an A.C. power supply network. The power switching device contains a bridge recitifer G1 with the four diodes D1 to D4 and two transistors T1 and T2. The collectors and emitters of the transistors T1 and T2, which are connected together, are connected to one diagonal of bridge rectifier G1, and the other diagonal is connected by two windings W1 and W2 of a choke DR in series with the above-mentioned consumer LR. The bridge rectifier G1 serves to protect the transistors T1 and T2 against incorrect polarity and allows bidirectional operation of the line switching device associated with the transistors T1, T2. The choke windings W1, W2 cooperate with capacitors C1 and C2, connected in parallel, both as elements to reduce interference and as protective elements for the semi-conductor elements in the illustrated device.

To drive the transistors T1 and T2, their bases are each connected through a respective current-limiting resistor R1 or R2 with the secondary windings of two driver transformers TR1 and TR2. A driving voltage U1 or U2 is supplied to the primary windings of the transformers TR1 and TR2, so that the primary windings are connected to separate output terminals of a driving voltage generator SG. The driving voltage generator SG is designed so that it produces control signals at its output terminals, the frequency of these signals being much higher than the line frequency and being, for example, about 10 kHz. In addition, the control signals are at least approximately in the form of square-wave signals, the driving voltages U1 and U2, produced on the two output terminal pairs of control signal generator SG being displaced in time relative to each other, but overlap, as shown in FIG. 5. FIG. 5 also shows that the square-wave driving pulses exhibit additional negative going pulses of opposite polarity, which serve to eliminate remanent magnetization in the transformers TR1 and TR2. The operation of this line switching device which contains the bridge rectifier G1 and driven transistors T1 and T2 is described hereinbelow.

This power switching device which periodically damps and discharges the consumer LR, VG, contains an additional bridge rectifier G2, with four diodes D5 to D8, which has one diagonal connected, via a limiting and load resistor R4 and an additional winding W3 of the choke DR, in parallel to the consumer which comprises the ballasts VG and fluorescent tubes LR. The collector-emitter leads of a Darlington transistor T3 are connected to the other diagonal of the bridge rectifier G2, and the base of this transistor is connected to the secondary winding of another driver transformer TR3, via a current limiting resistor R3. A driving voltage U3 is supplied to the primary winding of transformer TR3. The driving voltage is supplied from additional output terminals of the driving voltage generator SG. The driving voltage U3, like driving voltages U1 and U2, is a square-wave voltage and has a much higher frequency than the line frequency. Preferably, the driving voltage U3 has the same shape and frequency as driving voltages U1 and U2, as shown in FIG. 5, but driving voltage U3 has no additional impulses of opposite polarity. As shown in FIG. 5 and described hereinbelow, the driving voltage generator SG produces the driving voltage U3 periodically if driving voltages U1 and U2 are not being produced by driving voltage generator SG.

At the beginning of a half wave of the A.C. line voltage (phase angle of zero degrees corresponding to points t0, t2, t4, etc., in FIG. 3), the driving voltage generator SG delivers the driving voltages U1 and U2 to the primary windings of driving transformers TR1 and TR2. Initially the square-wave pulse of the driving voltages U1 is supplied to the transistor T1 via one transformer, e.g., the transformer TR1, so that this transistor conducts. Before the transformer TR1 begins to be saturated, the square-wave pulse of driving voltage U2 arrives at the transformer TR2 and brings the transistor T2 into the conducting state, at a point in time when the overlap of the driving voltages U1 and U2 makes the transistor T1 still conducting, so that a continuous flow of current to the consumers LR, GS is assured. The gating OFF pulse in driving voltage U1 then blocks the transistor T1. This sequence is repeated alternately for the transistors T1 and T2, so that the load is distributed uniformly over the two transistors T1 and T2 which are involved, while the current flowing through consumers VG and LR continuously assumes the pattern of the A.C. line voltage in the half wave in question. In order to achieve the desired current flow angle, the driving voltage generator SG then interrupts the delivery of the driving voltages U1 and U2 at the corresponding phase angle of the half wave corresponding to points t1, t3, t5, etc., in FIG. 3, so that the transistors T1 and T2 are no longer driven into the conducting state until the beginning of the next half wave. The diodes D1 to D4 of the bridge rectifier G1 serve to provide correct polarity in view of the alternating sign of the half waves.

With a slight delay, taking into account the charging and discharging times of the semiconductor elements, the driving voltage generator SG produces the square-wave driving voltage U3 (FIG. 5) within the same half wave to the last pulse of the driving voltages U1, U2, so that the Darlington transistor T3 becomes conducting. Since the pulse gaps in driving voltage U3 are smaller than the charging time of the Darlington transistor T3, The transistor T3 conducts continuously. The conducting state of the transistor T3 provides a current path parallel to the consumers LR, GS via the bridge rectifier G2, i.e., its diodes D5, D7 and D6, D8, depending on the polarity of the half wave in question, the load resistor R4, and the winding W3 of the choke DR. Thus, the electrical energy stored in the consumers LR, GS, indicated in FIG. 4 by the capacitor C3 shown in dashed outline for compensating and parasitic capacity, can discharge continuously through the Darlington transistor T3.

As is evident from FIG. 5, driving voltage generator SG interrupts the supply of driving voltage U3 shortly before the next zero cross-over point of the A.C. line voltage, i.e., shortly before the driving voltage generator SG again brings the transistors T1 and T2 alternately to the conducting state by means of the driving voltages U1 and U2.

The suppression of peak loads, accomplished by this discharging of the complex consumer or consumers, when the consumer or consumers are reconnected to the A.C. line following periodic disconnection from the latter for power regulation is admittedly subject to losses, but the latter are completely acceptable and insignificant in contrast to the advantage of avoiding peak loads. For example, the device shown in FIG. 4 is used to control a fluorescent tube illuminating fixture, designed for a rated current of 35 amperes and provided with a parallel capacitance of 450 microfarads for complete compensation of the fluorescent tube. In the least favorable case, this capacitance is charged at a voltage of 300 V, so that an energy of 135 mWs must be dissipated per half wave, since the remainder of the non-capacitively stored energy is dissipated through the ballast and the fluorescent tubes. The total efficiency of the device shown in FIG. 4 is therefore subject to only 1.7% deterioration.

Driving the transistors T1, T2, and T3 via transformers makes it possible to keep the required driving power low, using impedance matching. It also allows separation of the potentials of the bases of the transistors T1, T2 and T3. The production of the square-wave control signals U1, U2, and U3 with a frequency significantly higher than the line frequency can be accomplished, as shown, by a single driving voltage generator SG having three distinct outputs, so that the latter can be made relatively simple.

It is to be understood that the device illustrated in FIG. 4 and discussed hereinabove, as well as the method which is carried by this device, is set out by way of illustration, not by way of limitation. Other embodiments and numerous variants are possible within the spirit and scope of the present invention, its scope being defined by the appended claims.

What is claimed is:

1. In a method of polarity-independent reduction of feedback from a consuming means periodically connected to an A.C. line which includes disconnecting the consuming means from the line during a predetermined period in each half wave of the A.C. line voltage, the improvement including damping and discharging the consuming means during each half wave of the A.C. line voltage using a power switching means during said predetermined period when the consuming means is disconnected from the A.C. line.

2. An improved method according to claim 1, wherein said power switching means comprises at least one transistor, the collector-emitter leads of the transistor being located in a current path parallel to the consuming means, wherein said damping and discharging is effected by enabling the transistor to conduct during at least one portion of the time interval between a connection and reconnection of the consuming means with the A.C. line, with a switching frequency higher than the A.C. line frequency, disconnection occurring during a period of time which is shorter than the charging time of the transistor.

3. An improved method according to claim 2, wherein said enabling step is effected by applying a driving voltage, at least approximately a square-wave voltage, to a control electrode of the transistor.

4. An improved method according to claim 3, including supplying said driving voltage via a transformer.

5. A power switching device for polarity-independent reduction of feedback from a conserving means which is periodically connected to an A.C. line, the improvement comprising at least one transistor having collector and emitter leads; a rectifier means for supplying voltage at proper polarity for the consuming means to the transistor; circuit means connected in series with said rectifier means and in parallel to said consumer means; and a transformer having its secondary winding connected to the base-emitter circuit of said transistor and its primary winding connected with a source of switching voltage for producing driving voltage for said transistor.

6. A power switching device according to claim 5, wherein said rectifier means comprise a bridge rectifier, one of whose diagonals is connected parallel to said consumer means and with the collector-emitter leads of said transistor connected to the other diagonal.

7. A power switching device according to claim 5, wherein said circuit means comprises an ohmic resistor and a choke.

8. A power switching device according to claim 5, including additionally line switching means for coupling said consuming means to the A.C. line, said switching means including additional transistors, said additional transistors being connected via transformers to circuit means for producing respective driving voltages for all said transistors.

9. A power switching device according to claim 5, wherein said at least one transistor is a Darlington transistor.

10. A power switching device according to claim 5, wherein said consuming means is connected to the A.C. line via line switching means, said line switching means being connected to said consumer means via at least one protective choke.

11. A power switching device according to claim 5, including said consuming means, said consuming means being at least one illuminating fixture; and line switching means whose variable current flow angle begins in each half wave of the A.C. line voltage at least approximately at a phase angle of zero degrees of the A.C. line voltage.

* * * * *